May 5, 1964

L. F. WILSON ETAL 3,131,638

LEAK DETECTING DEVICE

Filed July 5, 1962

INVENTORS.
LAWRENCE F. WILSON
VICTOR LEIPOLD
BY Cumpston + Shaw

THEIR ATTORNEYS.

May 5, 1964   L. F. WILSON ETAL   3,131,638
LEAK DETECTING DEVICE

Filed July 5, 1962   3 Sheets-Sheet 2

INVENTORS.
LAWRENCE F. WILSON
VICTOR LEIPOLD
BY Cumpston + Shaw

THEIR ATTORNEYS.

May 5, 1964 L. F. WILSON ETAL 3,131,638
LEAK DETECTING DEVICE
Filed July 5, 1962 3 Sheets-Sheet 3

INVENTOR.
LAWRENCE F. WILSON
VICTOR LEIPOLD
BY Cumpston + Shaw

THEIR ATTORNEYS.

United States Patent Office 3,131,638
Patented May 5, 1964

3,131,638
LEAK DETECTING DEVICE
Lawrence F. Wilson, Caledonia, and Victor Leipold, Le Roy, N.Y., assignors to Lapp Insulator Company, Inc., Le Roy, N.Y., a corporation of New York
Filed July 5, 1962, Ser. No. 207,619
18 Claims. (Cl. 103—44)

This invention relates to compressors and pumps of the diaphragm type and more particularly to a leak-detecting device for the diaphragm assembly of such compressors and pumps.

The present invention is particularly adapted for use in compressors and pumps of the diaphragm type which are designed for the compression of gases and displacement of liquids of the type wherein a diaphragm member is mounted for reciprocatory movement in a chamber of generally biconical form defined by two plate or housing members, the diaphragm being clamped between said plates adjacent its periphery. In pumps and compressors of the above type one plate or housing member is provided with intake and outlet valves for the gas or liquid to be pumped or compressed, while the other plate is formed with a series of apertures or ports through which a pumping liquid, generally oil, is caused to flow under the action of a reciprocatory pump piston. The reciprocations of the pump piston cause the pumping or working liquid to impart a reciprocatory motion or vibration to the diaphragm which in turn pumps or compresses the gas or liquid on the opposite side thereof. Pumps of this type are generally well known and reference is made to United States Patent No. 2,691,943 for an example thereof.

In the past, it has been proposed to construct a leak-detecting device for quickly detecting any puncture or leak in the diaphragm of the pump or compressor by forming a circumferentially extending chamber outboard of the diaphragm member. This chamber was usually located between the two plate or head members of the pump whereby any material leaking out from the pump was collected and run to a suitable leak-detecting device. An example of this construction can be seen in the patent to Surre, No. 2,662,478. However, devices of the above type have not been completely satisfactory, because of the expense involved in providing the circumferentially extending chamber outwardly of the periphery of the diaphragm for collecting any leakage, plus the fact that there has been no way to rapidly and efficiently convey any material which might leak through the diaphragm members outwardly to the chamber for the purpose of collection and detection.

Therefore, one object of the present invention is to provide a leak-detecting device for diaphragms of the above type which will not require the construction of an auxiliary collection chamber extending circumferentially around the pump outwardly of the diaphragm assembly.

Another object of the present invention is to provide a leak-detecting device having the above advantages which is provided with means for quickly and efficiently collecting any liquid or fluid which may leak through one of the imperforate diaphragm members and for conveying the same to a suitable leak-indicating device.

A further object of the present invention is to provide a leak-detecting device for diaphragm assemblies having the above advantages which may be readily and economically manufactured and assembled without the use of special tools.

To these and other ends the invention resides in certain improvements and combinations of parts, all as will be hereinafter more fully described, the novel features being pointed out in the claims at the end of the specification.

The preferred embodiment of the present invention, herein disclosed by way of illustration, preferably comprises a diaphragm assembly 20 adapted for use in a measuring pump shown generally at 22 and a leak-indicating apparatus shown generally at 24.

Figure 1:
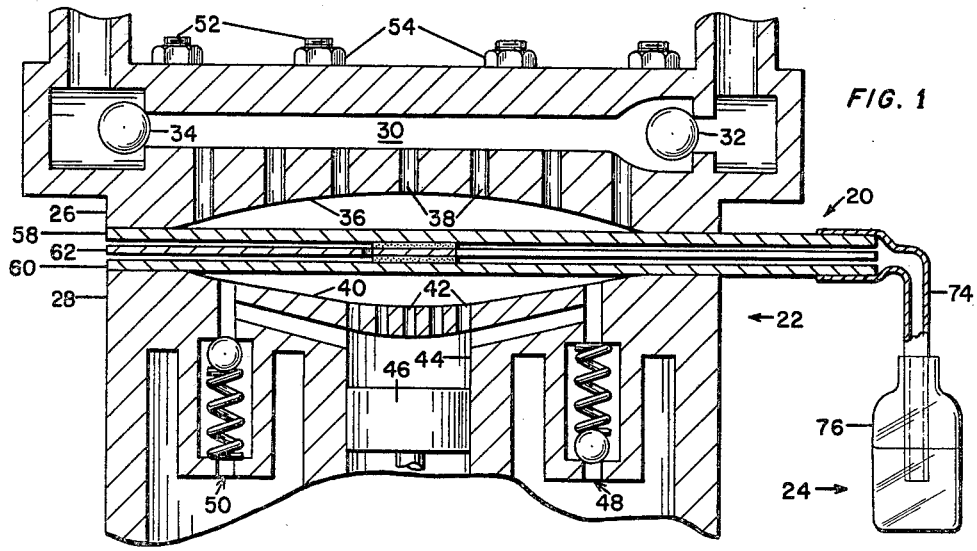
FIG. 1 is a sectional view of a pump having mounted therein a diaphragm assembly and leak-detecting device embodying the present invention.

Measuring pump 22 comprises preferably a pair of cylindrical plates 26 and 28, of corrosion resisting material, as for example, stainless steel, and having a substantial thickness as shown in FIG. 1 and are thus adapted to withstand high fluid pressures. Plate 26 is provided with a transversely extending bore 30 which has located adjacent the opposite ends thereof suitable inlet and outlet check valve means 32 and 34, respectively. Plate 26 is formed at one surface thereof with a conical interface 36 which is connected to bore 30 by means of a series of passageways 38.

Plate 28 is formed with a conical recess or interface 40. A series of passageways 42 connect interface 40 with a cylinder 44 which has a piston 46 mounted therein for reciprocatory movement. Piston 46 is adapted to pump an actuating fluid, such as oil or the like, through passageways 42 and to cause diaphragm assembly 20 to reciprocate as the actuating fluid is alternately forced against the diaphragm assembly and then drawn away therefrom by the reciprocatory action of piston 46. Plate or housing member 28 is also provided with suitable check valve inlet means 48 and pressure relief means 50 whereby the subchamber formed between interface 40 and diaphragm assembly 20 is always full of actuating fluid, as well understood in the art.

Plates 26 and 28 are positioned as shown in FIG. 1 with diaphragm assembly 20 sandwiched therebetween and their peripheries are held together by suitable bolts 52 and nuts 54, as shown. For this purpose each of the members comprising diaphragm assembly 20 is provided with a series of spaced holes 56 for the reception of bolts 52. Thus, it will be seen that as diaphragm assembly 20 is caused to reciprocate in response to the pulsation of the actuating fluid passing through apertures 42 against the underside of the diaphragm assembly into the subchamber between the diaphragm assembly and interface 40, such movement of the diaphragm serves to alternately enlarge and contract the sub-chamber formed between the diaphragm assembly and interface 36 on the opposite side of the diaphragm assembly and to thereby effect a pumping of a second fluid through check valves 32 and 34 and bore 30.

Figure 2:
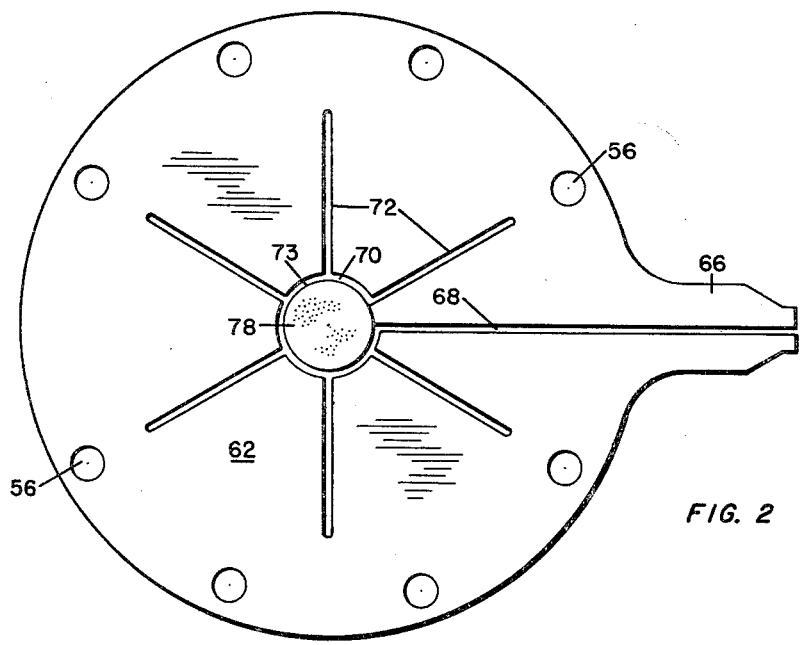
FIG. 2 is a top plan view of the center member of the diaphragm assembly.
Figure 5A:
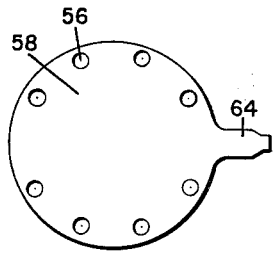
FIGS. 5A, 5B and 5C are top plan views of the three diaphragm members comprising the diaphragm assembly shown in FIGS. 1 and 4.

It has been found in the past that diaphragms of the above type which may be of stainless steel, Teflon or other suitable chemically inert slightly resilient materials tend to crack and rupture and allow the actuating fluid and the fluid being pumped to intermix. Since it is undesirable and often dangerous and/or expensive to allow the fluids to intermix in this nature, it is an object of the present invention to provide a means which will readily detect any leakage of either the actuating fluid or the fluid being pumped and transmit this information to a suitable indicating device, so that the operator may quickly stop the pump and make the necessary repairs. To this end, diaphragm assembly 20 preferably comprises at least three separate diaphragm members, the first and third or outer members preferably being imperforate and of desired chemically resistant material while the center member is a leak-detecting member and is preferably shaped as shown in FIG. 2. The imperforate diaphragm members 58 and 60 are shown in FIGS. 5A and 5C, respectively, while the detecting member 62 is shown in FIGS. 2 and 5B.

The diaphragm members 58 and 60 are each formed with an outwardly extending projecting portion or neck 64. The center diaphragm member 62 is similarly formed with an outwardly extending neck portion 66 which is substantially the same size and shape as portion 64. When the three diaphragm members are positioned between the pump or compressor housing members 26 and 28, as in FIGS. 1 and 4, portions 64 and 66 lie in superimposed relation.

Figure 5B:
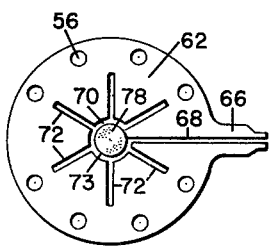
Figure 5C:
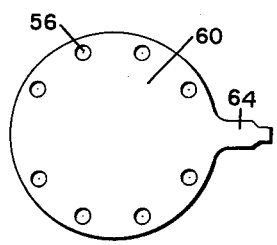

Diaphragm member 62 is formed with a radially extending slot 68 which extends outwardly through neck portion 66, as shown in FIGS. 2 and 5B. The inner end of slot 68 terminates in a collection slot 70 which is preferably substantially circular and which has running outwardly radially therefrom a series of slots 72. Slots 72 do not extend to the outer edge of diaphragm member 62 but terminate inwardly of bolt holes 56, as shown in the above figures. As shown in FIG. 2, slot 70 forms less than a complete circle and leaves a central portion 73 which is preferably imperforate. It will be seen from an inspection of FIGS. 2 and 5B that by means of slots 72, 70 and 68, there is no portion of the central diaphragm member which is an appreciable distance away from one or more of the above slots. Thus, when the diaphragm is assembled by the superpositioning of members 58, 62 and 60, slots 68 and 70 and 72 form, with diaphragm members 58 and 60, a series of passageways which all lead outwardly through slot 68.

Figure 4:
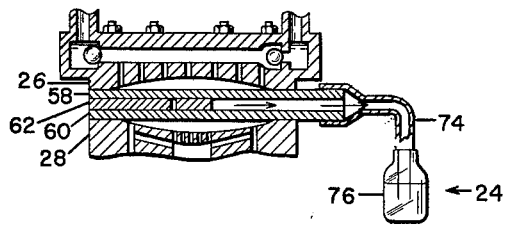
FIG. 4 is similar to FIG. 1 but on a reduced scale.

Since diaphragm members 58 and 60 are each formed with neck portions 64 similar to neck portion 66, slot 68 forms a closed passageway or tube which extends beyond the pump housing members 26 and 28 and which may be connected to leak-detecting device 24 as by means of a rubber or plastic hose 74, as shown in FIGS. 1 and 4. We have found that even the most minute fracture or rupture in either diaphragm members 58 or 60 will lead to a leakage of fluid through that particular diaphragm and into contact with detecting diaphragm 62. However, as a result of our novel construction, any fluid contacting diaphragm member 62 quickly reaches one or more of slots 72 and 70 and passes outwardly through slot 68 and tube 74 to indicating device 24. Indicating device 24 may be of any suitable and known construction, and for the purposes of illustration only, we have shown a bottle having a quantity of liquid therein which is so positioned that the lower end of hose 74 extends below the surface of the liquid. It will be readily understood that if the fluid leaking through one of diaphragm members 58 or 60 is a gas, it will cause a bubbling action in the liquid in bottle 76, whereas if the material leaking through one of diaphragm members 58 and 60 is a liquid, this action will be indicated by a rise in the level of the liquid in bottle 76. However, other known indicating devices may be substituted for bottle 76 without departing from the spirit of the present invention.

Figure 3:
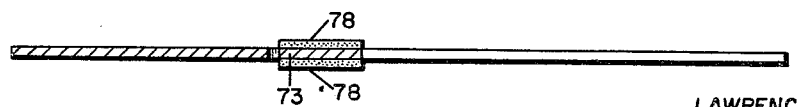
FIG. 3 is a central sectional view thereof.

In addition to the formation of slots 70 and 72, we preferably secure central diaphragm member 62 to diaphragm members 58 and 60 by means of a suitable nonhardening or flexible adhesive such as latex cement. This adhesive 78 is applied to central circular portion 73 of member 62 on both the upper and lower surfaces thereof, as shown in FIG. 3, and insures that the three diaphragm members will move in unison as the diaphragm assembly is caused to reciprocate by the action of piston 46. We have found that if connecting means such as adhesive 78 is not used, diaphragms 58 and 62 will move relative to one another and will merely effect a pumping action therebetween. This reduces the main pumping action and interferes with the operation of the indicating device.

Thus, our invention provides a novel leak-detecting device for pump and compressor diaphragms which is so constructed that even the minutest leakage through one of the imperforate diaphragm members will be quickly indicated in the leak indicating mechanism. Slots 68, 70 and 72 are so situated that any leakage through either of the diaphragms 58 or 60 will quickly reach one of the above slots and will then pass outwardly through slot 68 into indicating mechanism 24. This result is achieved without the necessity of extending a circumferential chamber outward of the periphery of the diaphragm assembly and it can be readily seen that our improved diaphragm assembly may be readily substituted for diaphragms now used in various pumps and compressors without the need for changing the pump or compressor and without requiring the addition of costly or intricate apparatus.

Figure 6:
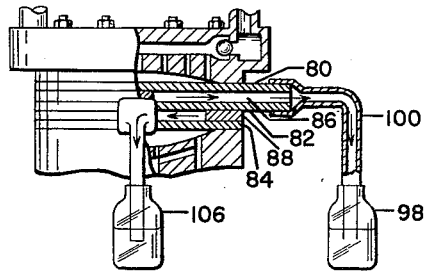
FIG. 6 is a side elevational view partly in section showing a modification of the diaphragm assembly shown in FIGS. 1 and 4.
Figure 7A:
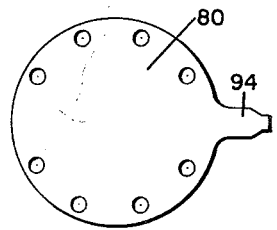
FIGS. 7A, 7B, 7C, 7D and 7E are top plan views of the five diaphragm members comprising the diaphragm assembly shown in FIG. 6.
Figure 7B:
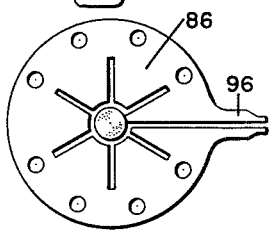
Figure 7C:
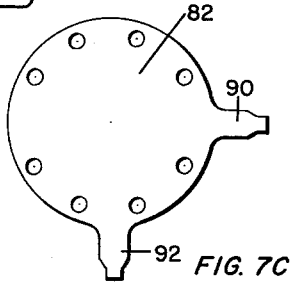
Figure 7D:
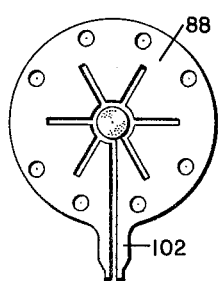
Figure 7E:
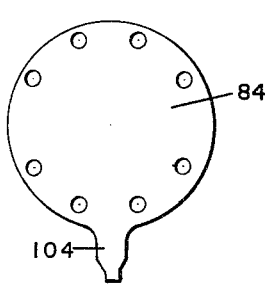

While the above diaphragm assembly will detect leakage through either of the imperforate diaphragms and thus indicate that either the actuating fluid, or the fluid being pumped or compressed, is leaking, we also have devised a diaphragm assembly which will selectively indicate which fluid is leaking, and thus, which diaphragm has failed. FIG. 6 shows such a diaphragm assembly in place between the pump members, while FIGS. 7A–7E show individual diaphragm members which, when sandwiched together, comprise the diaphragm assembly shown in FIG. 6.

In this modified construction we preferably use five diaphragm members with the first 80, third 82 and fifth 84 members being imperforate and similar to members 58 and 60 shown in FIGS. 5A and 5C. The second and fourth diaphragm members 86 and 88 are detecting members and are identical to member 62 shown in FIG. 5B. The middle or third diaphragm member 82 is an imperforate one and is provided with two outwardly extending neck portions 90 and 92, shown in FIG. 7C. Neck portion 90 together with neck 94 on diaphragm 80 and neck 96 on diaphragm 86 form the outlet for one leak detecting network and may be connected to a suitable indicating device 98 as by means of a rubber or plastic tube 100 as shown in FIG. 6. The second neck member 92 on diaphragm 82 together with neck 102 on diaphragm 88 and neck 104 on diaphragm 84 form a second leak-detecting network which is connected to a second indicating device 106 by means of a suitable hose or tube as shown in FIG. 6.

It will be readily understood that with the construction shown in FIGS. 6 and 7A–7E, leakage of the actuating fluid through the lower diaphragm 84 will quickly be detected by diaphragm 88 and indicated in indicating device 106. Similarly, any leakage through diaphragm member 80 of the fluid being pumped or compressed will be detected by diaphragm 86 and transferred to indicating device 98.

Figure 8:
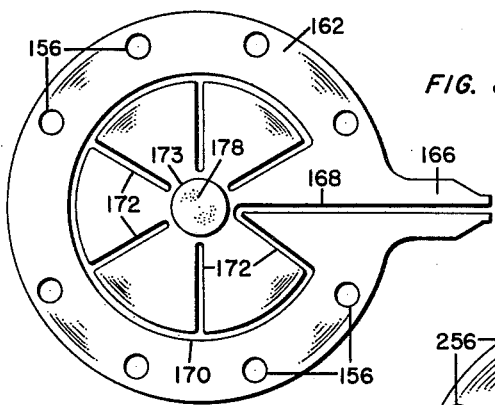
FIG. 8 is a top plan view of a modification of the center diaphragm member on a scale slightly larger than that used in FIGS. 4–7, but smaller than that used in FIGS. 1–3.

FIG. 8 discloses a modified leak-detecting diaphragm member 162 which is similar to member 62 except for the configuration of the collection slots formed therein. The parts of member 162 are indicated by reference characters which are 100 units higher than the reference characters used to indicate the corresponding parts of member 62. Member 162 is provided with an outwardly extending neck portion 166 which is substantially the same size and shape as neck portion 66 on diaphragm member 62. Member 162 is formed with a radially extending slot 168 which extends outwardly through neck portion 166 as shown in FIG. 8. The inner end of slot 168 terminates at the inner end of one of a series of spaced radially extending slots 172. Slots 172 do not extend to the outer edge of diaphragm member 162, but terminate in a collection slot 170 which is preferably substantially circular and which is spaced inwardly from bolt holes 156 as shown in FIG. 8. The inner ends of slots 172 terminate short of the center of the diaphragm so as to form a central portion 173 which is preferably imperforate and which preferably has a coating of latex cement 178 or other suitable flexible, non-hardening adhesive applied to the opposite surfaces thereof. It will be seen from an inspection of FIG. 8 that there is no portion of diaphragm member 162 which is an appreciable distance away from one or more of the above slots. Thus, when a diaphragm assembly is constructed by superpositioning members 58, 162 and 60, slots 168, 170 and 172 form, with diaphragm members 58 and 60, a series of passageways which all lead outwardly through slot 168 and into a suitable leak-indicating device, such as that shown at 24 in FIGS. 1 and 4.

Figure 9:
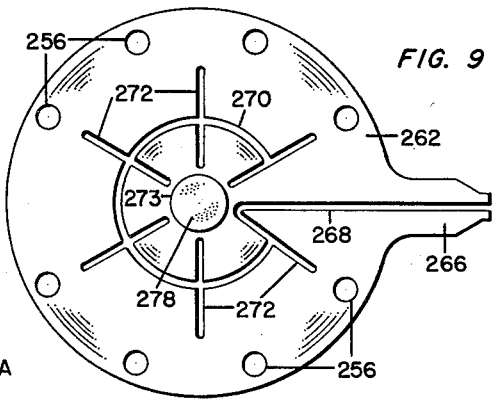
FIG. 9 is a top plan view of a further modification of the center diaphragm member.

FIG. 9 discloses a further modification of the central diaphragm member wherein a diaphragm member 262 is similar to member 62 except for the configuration of the collection slots formed therein. The parts of member 262 are indicated by reference characters which are 200 units higher than the reference characters used to indicate the corresponding parts of member 62. Member 262 is provided with an outwardly extending neck portion 266 which is substantially the same size and shape as neck portion 66 on diaphragm 62. Member 262 is formed with a radially extending slot 268 which extends outwardly through neck portion 266 shown in FIG. 9. The inner end of slot 268 terminates at the inner end of one of a series of spaced, radially extending slots 272. Slots 272 do not extend to the outer edge of diaphragm member 262, but terminate inwardly of bolt holes 256 as shown in FIG. 9. The inner ends of slots 272 terminate short of the center of the diaphragm so as to form a central portion 273 which is preferably imperforate and which has a coating of latex cement 278 or other suitable flexible, non-hardening adhesive applied to the opposite surfaces thereof.

Slots 272 are connected by means of a collection slot 270 which is preferably substantially circular and which intersects slots 272 adjacent the mid-points thereof, although it is obvious that slot 270 may be formed to intersect slots 272 at any point between the inner and outer ends thereof. It will be seen from an inspection of FIG. 9 that there is no portion of diaphragm member 262 which is an appreciable distance away from one or more of the above slots. Thus, when a diaphragm assembly is constructed by superpositioning diaphragm members 58, 262 and 60, slots 268, 270 and 272 form, with diaphragm members 58 and 60, a series of passageways which all lead out through slot 268 and into a suitable leak-indicating device, such as that shown at 24 in FIGS. 1 and 4.

Figure 10:
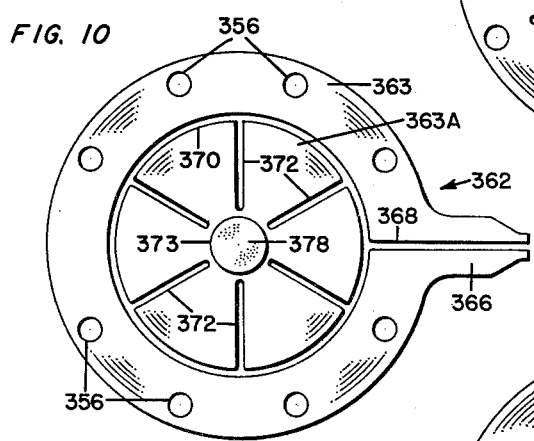
FIG. 10 is a top plan view of still a further modification of the diaphragm member.
Figure 11:
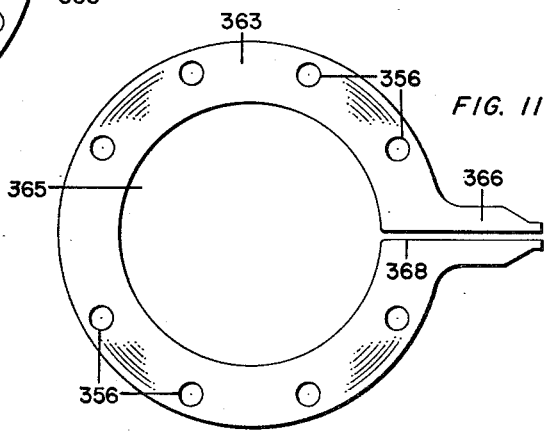
FIG. 11 is a top plan view of the outer portion of the diaphragm member shown in FIG. 10.
Figure 12:
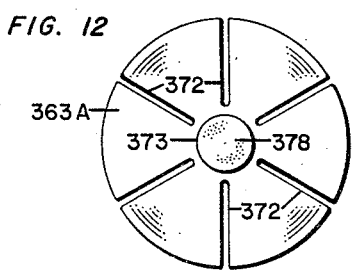
FIG. 12 is a top plan view of the inner portion of the diaphragm member shown in FIG. 10.

FIG. 10 discloses a further modified central diaphragm construction shown generally at 362, which comprises an outer annular member 363 and an inner circular member 363a. Member 363 is preferably formed with an outwardly extending neck portion 366 and a series of spaced bolt holes 356. Member 363 is formed with a large circular opening 365 in the center thereof as shown in FIG. 11. An outwardly extending radial slot 368 extends from the inner edge of member 363 outwardly through neck opening 366.

Inner portion 363a is preferably slightly smaller in diameter than opening 365 in member 363, so that when member 363a is positioned within member 363 as shown in FIG. 10, a continuous circular slot 370 is formed between members 363 and 363a. Inner portion 363a is formed with a series of spaced, inwardly extending radial slots 372 which terminate short of the center thereof so as to form a central portion 373 which is preferably imperforate and which preferably has a coating of latex cement 378 or other suitable flexible, non-hardening adhesive applied to the opposite surfaces thereof for cementing member 363a in the proper position between external imperforate diaphragm members 58 and 60 in the same manner as described earlier in connection with diaphragm members 62, 162 and 262. Slot 370 which is formed between members 363 and 363a, connects slot 368 with slots 372 and it will be readily seen that slots 368, 370 and 372 will perform the same function and in the same manner as slots 168, 170 and 172 shown in FIG. 8. It is also obvious that when a diaphragm assembly is constructed by superpositioning members 58, 363, 363a and 60, slots 368, 370 and 372 form, with diaphragm members 58 and 60, a series of passageways which all lead outwardly through slot 368 and into a suitable leak-indicating device such as that shown at 24 in FIGS. 1 and 4.

Thus it will be readily understood that a leak-detecting diaphragm assembly may be constructed using as a central diaphragm member one of members 62, 162, 262 or 362 and the assembly will detect leakage through either of the imperforate diaphragms, and thus, indicate to the operator that either the actuating fluid or the fluid being pumped or compressed is leaking. In addition, the five-diaphragm assembly shown in FIGS. 6 and 7 may be constructed using two of the central diaphragm members shown at 62, 162, 262, or 362, or a diaphragm such as 62 might be used for one of the detecting members while a diaphragm such as 162, 262 or 362 might be used for the other detecting member. It is obvious that the two detecting or central diaphragm members may be of any of the above constructions or the equivalents thereof without departing from the spirit of the invention.

Thus, it will be seen that our invention accomplishes its objects and provides a practical, efficient, inexpensive and highly reliable device for indicating any leakage through the diaphragms of pumps or compressors. Our device may be readily substituted for known diaphragm assemblies without altering the construction of the pump or compressor upon which it is used and without the need for special tools and equipment. In addition, our diaphragm assembly may be constructed not only to indicate leakage through one of the imperforate diaphragms but with the five-layer construction shown in FIGS. 6 and 7 our diaphragm assembly will quickly and accurately indicate which diaphragm is leaking, so that the operator may promptly take the necessary steps to correct the situation.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention or the scope of the appended claims.

We claim:

1. In a fluid-operating apparatus of the type comprising two plates defining a chamber, a diaphragm assembly stretched across said chamber and gripped at its periphery between said plates to divide said chamber into two sub-chambers, means for the intake and discharge of a first fluid into and from one of said sub-chambers, means for the intake and discharge of a second fluid into and from the other sub-chamber, said diaphragm assembly comprising a lamination of at least three diaphragm members including a central and two imperforate side members, and leak-indicating means connected to said diaphragm assembly wherein, (a) each of said diaphragm members has a portion thereof extending outwardly beyond said plates, said portions lying in superimposed relationship, (b) said central member is formed with a first slot extending inwardly from the outer end of said outwardly extending portion thereof, and (c) said central member is formed with a plurality of spaced slots each of which is connected with said first-mentioned slot whereby any leakage of either fluid through the respective one of said side members will pass through said first-mentioned slot to said leak indicating means.

2. A fluid-operating apparatus as specified in claim 1 in which each of said plurality of slots in said central member extends outwardly from adjacent the center of said central member to adjacent the periphery thereof.

3. A fluid-operating apparatus as specified in claim 1 in which each of said plurality of slots in said central member extends outwardly from adjacent the center of said member to adjacent the periphery thereof leaving a substantially imperforate area adjacent the center of said member.

4. A fluid-operating apparatus as specified in claim 1 in which (a) said central member is formed with a collection slot, (b) each of said plurality of slots in said central member is connected to said collection slot, and (c) said collection slot in turn is connected to said first-mentioned slot.

5. A fluid-operating apparatus as specified in claim 1 in which (a) said central member is formed with a substantially circular collection slot, (b) each of said plurality of slots in said central member is connected to said collection slot, and (c) said collection slot in turn is connected to said first-mentioned slot.

6. A fluid-operating apparatus as specified in claim 1 in which said central diaphragm member is attached to each of said side members adjacent the center portions thereof to insure reciprocatory movement of all diaphragm members in unison.

7. In a fluid-operating apparatus of the type comprising two plates defining a chamber, a diaphragm assembly stretched across said chamber and gripped at its periphery between said plates to divide said chamber into two sub-chambers, means for the intake and discharge of a first fluid into and from one of said sub-chambers, means for the intake and discharge of a second fluid into and from the other sub-chamber, said diaphragm assembly comprising a lamination of at least three diaphragm members including a central and two imperforate side members, and leak-indicating means connected to said diaphragm assembly wherein, (a) each of said diaphragm members has a portion thereof extending outwardly beyond said plates, said portions lying in superimposed relationship, (b) said central member is formed with a first slot extending inwardly from the outer end of said outwardly extending portion thereof, and (c) said central member is formed with a plurality of spaced slots, each of which is connected adjacent one end thereof with said first-mentioned slot whereby any leakage of either fluid through the respective one of said side members will pass through said first-mentioned slot to said leak-indicating means.

8. A fluid-operating apparatus as specified in claim 7 in which each of said plurality of slots in said central member extends outwardly from adjacent the center of said central member to adjacent the periphery thereof.

9. A fluid-operating apparatus as specified in claim 7 in which each of said plurality of slots in said central member extends outwardly from adjacent the center of said member to adjacent the periphery thereof leaving a substantially imperforate area adjacent the center of said member.

10. A fluid-operating apparatus as specified in claim 7 in which:

(a) said central member is formed with a collection slot, (b) each of said plurality of slots in said central member is connected adjacent one end thereof to said collection slot, and (c) said collection slot in turn is connected to said first-mentioned slot.

11. A fluid-operating apparatus as specified in claim 7 in which:

(a) said central member is formed with a collection slot adjacent the center thereof, (b) each of said plurality of slots in said central member is connected adjacent one end thereof to said collection slot, and (c) said collection slot in turn is connected to said first-mentioned slot.

12. A fluid-operating apparatus as specified in claim 7 in which:

(a) said central member is formed with a collection slot adjacent the center thereof, (b) each of said plurality of slots in said central member extends substantially radially from adjacent the periphery of said central member to said collection slot, and (c) said collection slot in turn is connected to said first-mentioned slot.

13. A fluid-operating apparatus as specified in claim 7 in which:

(a) said central member is formed with a collection slot, (b) each of said plurality of slots in said central member is connected adjacent the outer end thereof to said collection slot, and (c) one of said plurality of slots is connected to said first-mentioned slot.

14. A fluid-operating apparatus as specified in claim 7 in which:

(a) said central member is formed with a collection slot, (b) each of said plurality of slots in said central member is connected adjacent the outer end thereof to said collection slot, and (c) said collection slot in turn is connected to said first-mentioned slot.

15. A fluid-operating apparatus as specified in claim 1 in which:

(a) said central member is formed with a collection slot, (b) each of said plurality of slots in said central member is connected medially thereof to said collection slot, and (c) one of said plurality of slots is connected to said first-mentioned slot.

16. In a fluid-operating apparatus of the type comprising two plates defining a chamber, a diaphragm assembly stretched across said chamber and gripped at its periphery between said plates to divide said chamber into two sub-chambers, means for the intake and discharge of a first fluid into and from one of said sub-chambers, means for the intake and discharge of a second fluid into and from the other sub-chamber, said diaphragm assembly comprising a lamination of at least three diaphragm members including a central and two imperforate side members, and leak-indicating means connected to said diaphragm assembly wherein, (a) each of said diaphragm members has a portion thereof extending outwardly beyond said plates, said portions lying in superimposed relationship,
(b) said central member comprises an inner circular member and an outer annular member,
(c) said outer annular member is formed with a slot extending from the inner edge thereof to the outer end of said extending portion thereof,
(d) said inner member is formed with a series of spaced slots the outer ends of which extend to the outer edge of said inner member, and
(e) said inner member is smaller in diameter than the inner diameter of said outer member so as to form a slot between said inner and outer members when said inner and outer members are assembled, whereby the leakage of either fluid through the respective one of said side members can pass from any one of said slots in said inner member through the slot formed between said inner and outer members and through said slot in said outer member to said leak-indicating means.

17. A fluid-operating apparatus as specified in claim 16 in which each of said plurality of slots in said inner member extends outwardly from adjacent the center of said member at the outer edge of said inner member leaving a substantially imperforate area adjacent the center of said inner member.

18. A fluid-operating apparatus as specified in claim 16 in which said inner member is attached to each of said side members adjacent the center portions thereof to cause reciprocatory movement of all diaphragm members in unison.

References Cited in the file of this patent

UNITED STATES PATENTS

| | | |
|---|---|---|
| 2,662,478 | Surre | Dec. 15, 1953 |
| 2,691,943 | Wilson | Oct. 19, 1954 |

FOREIGN PATENTS

| | | |
|---|---|---|
| 864,365 | France | Apr. 25, 1941 |